United States Patent [19]
Roberts et al.

[11] Patent Number: 4,728,773
[45] Date of Patent: Mar. 1, 1988

[54] LASER PROCESSING CENTER

[75] Inventors: David A. Roberts, Battle Creek; John M. Ruselowski, Dearborn, both of Mich.

[73] Assignee: Ex-Cell-O Corporation, Walled Lake, Mich.

[21] Appl. No.: 939,324

[22] Filed: Dec. 8, 1986

[51] Int. Cl.[4] .............................................. B23K 26/00
[52] U.S. Cl. ...................... 219/121 LT; 219/121 LG; 219/121 LU; 219/121 LS
[58] Field of Search ................... 219/121 LT, 121 LU, 219/121 LV, 121 LC, 121 LD, 121 LH, 121 LJ, 121 LS, 121 LG, 121 LN, 121 LK, 121 LL, 121 L, 121 LM

[56] References Cited
U.S. PATENT DOCUMENTS
4,722,600  3/1982  Crahay ..................... 219/121 LS X

*Primary Examiner*—C. L. Albritton
*Attorney, Agent, or Firm*—John C. Evans

[57] ABSTRACT

A laser processing system consists of three dedicated work stations for cutting to length a family of parts such as exhaust pipes. The processing center includes three laser stations each having a laser beam rotator that receives a laser beam and directs it into a cutting plane for processing the products at each of the stations. These stations are selectively operated by use of an improved laser beam delivery system including a beam sharing platform that is programmed to selectively deliver a laser beam output to each of the work stations for processing products. The beam sharing platform includes a plurality of separate angularly adjustable, presettable mirror units that can be precisely aligned with the pipe delivery system and matched to the processing requirements of a given work station.

14 Claims, 16 Drawing Figures

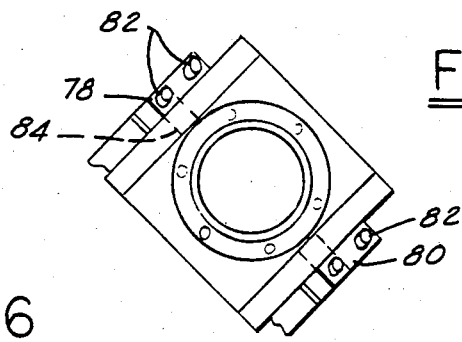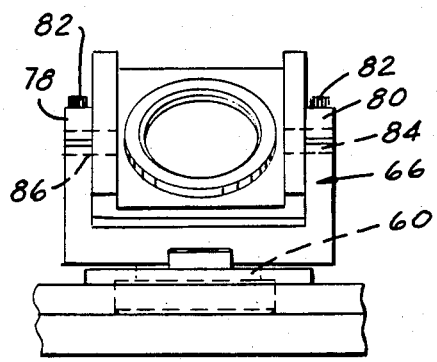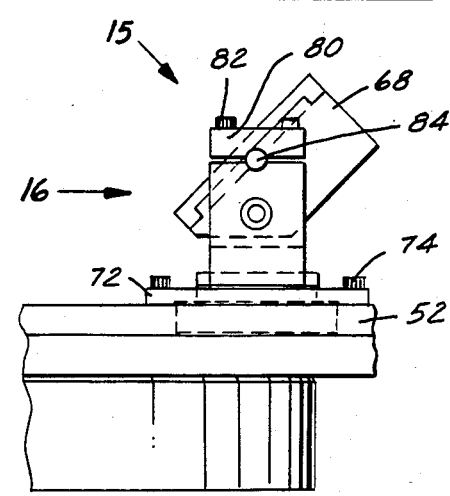

LASER PROCESSING CENTER

BACKGROUND OF THE INVENTION

This invention relates to laser processing systems and more particularly to laser processing systems for sharing a laser beam for processing at a plurality of separate dedicated work stations.

The use of laser beams for metal cutting have been provided in various machine apparatus. U.S. Pat. No. 3,986,767 shows such apparatus which includes a beam diverting system for directing a laser beam from the laser source to a laser beam focus head which is supported for movement on three axes to furthermore rotation of focusing mirrors are provided by alpha and theta drive units of the known type.

U.S. Pat. No. 4,461,947 discloses apparatus that will direct both a laser beam and gas stream onto a work piece. The optical system and nozzle are rotated in synchronism to cause the laser spot to trace a circle on the work piece in materials processing applications such as welding and cutting. U.S. Pat. No. 4,201,905 discloses a use of a laser unit on a machine tool in which the machine tool includes tubular pipes for diverting the laser beam from a laser source to a laser cutting head assembly which is mounted on a vertically adjustable support for performing a dedicated machine operation.

Furthermore, it is known that beam sharing systems can direct a laser beam from a laser source to a plurality of work stations. Such systems, however, require precise alignment of the laser beam and optical focusing device at the work station and require constant tuning of the position of the mirror components in the system to assure accurate processing at each of the plurality of work stations.

SUMMARY OF THE INVENTION

A laser processing system, in accordance with the present invention, includes a plurality of separate work stations each having conveyor means for moving a different work part with respect to a laser beam rotator that will focus a laser beam against a work part to cut the work part to form precise end configurations thereon. The laser output beam is guided to each of the cutting nozzles by a series of mirrors. The first of the mirrors are fixedly secured within the laser beam rotator at each of the work station. A beam sharing platform includes a plurality of adjustable mirrors thereon. The platform is selectively positioned by means of a stepping motor drive into one of a plurality of indexed angular positions at which one of the adjustable mirrors receives a laser beam from the laser generator and directs it through a tube to one of the laser beam rotators. The beam sharing platform and its drive are designed to assure that the laser power only is directed to a single work station. The focused beam passes through the laser beam rotator where required gas is introduced at a gas nozzle and directed onto the work piece. The addition of air or oxygen is selected as appropriate to increase cutting speed of the apparatus at the work station selected by indexing of the beam sharing platform. All of the optics in this system are readily accessible from externally of either the beam sharing platform or the laser beam rotator. Mirrors can be removed, cleaned and replaced without the need for realignment of the systems optics.

The whole system is sealed to prevent the entrance of foreign matter and work environment dirt.

The final reach of the beam delivery system is adjustable in length so as to accommodate different size parts.

According to the teachings of the present invention, the beam sharing platform enables a single laser source to be used to supply a plurality of work platforms and to define an adjustable distributive laser beam system that does not need to be tuned when the beam is directed to any one of the plurality of work stations.

Therefore, one of the objects of the present invention is to provide an improved laser beam sharing system for directing a single laser beam to one of a plurality of work stations including means for indexing one of a plurality of beam diverting mirrors into a position for receiving the source laser beam and directing it to a work station for carrying out a work piece cutting operation.

Another object of the present invention is to provide an improved laser beam sharing system by means of a rotatable beam sharing platform having a plurality of angularly displaced adjustable mirror assemblies thereon each selectively indexed into a beam receiving position and being preset in a beam directing relationship for directing the beam through a pipe distribution system to a laser beam rotator for producing a laser beam output through cutting nozzle means.

Yet another object of the present invention is to provide a laser processing system of the type set forth in either of the preceding objects wherein the beam sharing platform includes a housing having three equally angularly displaced beam diverting pipes and a single vertically oriented beam receiving inlet pipe and wherein the adjustable mirrors will selectively receive the beam from the inlet pipe and direct it through only one of the plurality of delivery pipes so that the beam is focused only on work pieces at one of the stations; and wherein the beam sharing platform is positioned by drive motor index means to be positioned to control the delivery of the laser beam to a work station at which work parts are being delivered for processing in accordance with a preselected controlled sequence.

Yet another object of the present invention is to provide an improved beam sharing system that includes a gear motor drive that is selectively energized and includes an output shaft connected to a drive wheel having a cam follower rotatably connected thereon which selectively engages a cam surface of a driven wheel to produce a precise indexed positioning of an output shaft from the driven wheel.

Yet another object of the present invention is to provide an improved indexable precision motor drive for driving such beam sharing platforms to locate it precisely at an angular position which is in alignment with the input pipe from the laser unit whereby the adjustably positioned mirror on the beam sharing platform will cause the laser unit's output to be precisely directed through one of the outlet pipes without the need for mirror component adjustment during operation of the multiple station system.

Still another object of the present invention is to provide an improved laser beam rotator that includes fixedly secured mirror assemblies that are accessible from the exterior of the rotator and wherein the rotator includes a first motor drive having an output connected to a worm gear for rotating the beam focusing lens to an output nozzle which forms a laser cutting beam that is rotated 360° to cut precise ends on a work piece.

These and other objects as specifically set out here are achieved by a laser processing system that includes an overhead CO2 laser source that is supported on a framework. The framework supports an optics bench having a beam splitter enclosure with an inlet pipe and three equally angularly located outlet pipes. The enclosure includes a beam sharing platform therein with a plurality of angularly spaced adjustable mirror assemblies. The platform is selectively angularly positioned by a gear drive motor and indexing means that will selectively position each of the adjustable mirrors to direct the laser beam from the inlet pipe through only one of the outlet pipes. The outlet pipe is directed to an optics bench that will divert the beam into one of a plurality of beam rotator units each having exteriorly accessible lens means thereon directing the beam to an offset laser beam output nozzle. Each rotator unit is rotatably driven through 360° to define a laser cutting beam at the output nozzle that will precisely finish work pieces advanced with respect to the output nozzle on conveyor means at each of the work stations.

Additional objects, advantages and characteristic features of the present invention will become apparent from the following detailed description of a preferred embodiment of the invention when considered in conjunction with the accompanying drawings:

BRIEF DESCRIPTION OF THE DRAWINGS

FIG. 14 is a view of one of the mirror units on the beam sharing platform of FIG. 12;

FIG. 15 is a view of the fully assembled mirror looking in the direction of the arrow 15 in FIG. 14; and FIG. 16 is a view of a partially assembled mirror assembly looking in the direction of the arrow 16 in FIG. 14.

DETAILED DESCRIPTION OF THE PREFERRED EMBODIMENT

Figure 1:
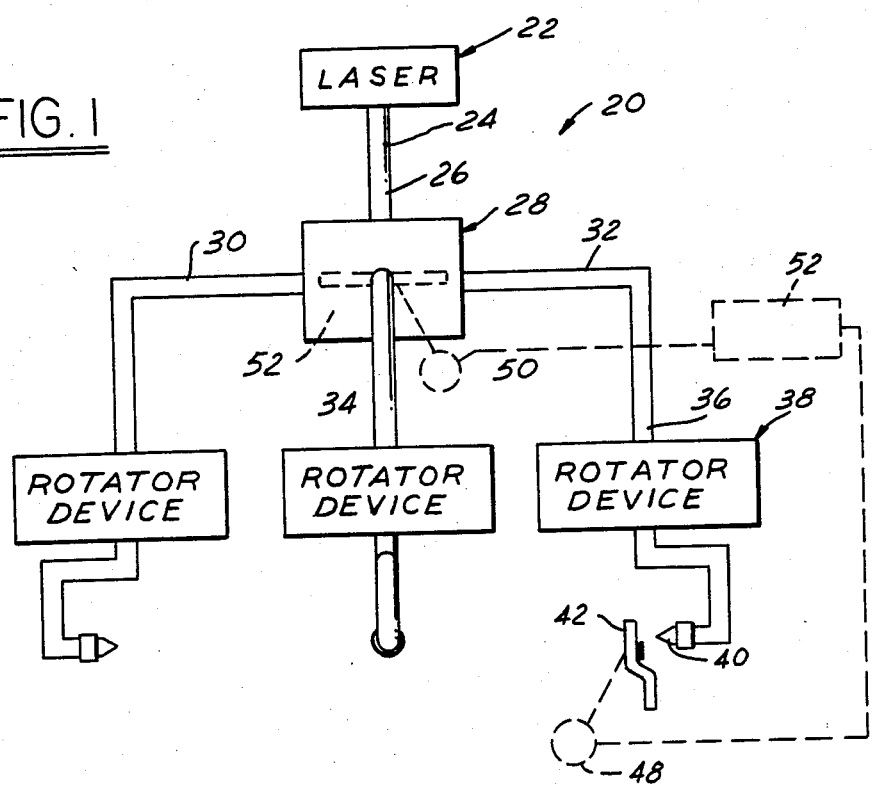
FIG. 1 is a diagrammatic view of a laser processing system in accordance with the present invention.
Figure 2:
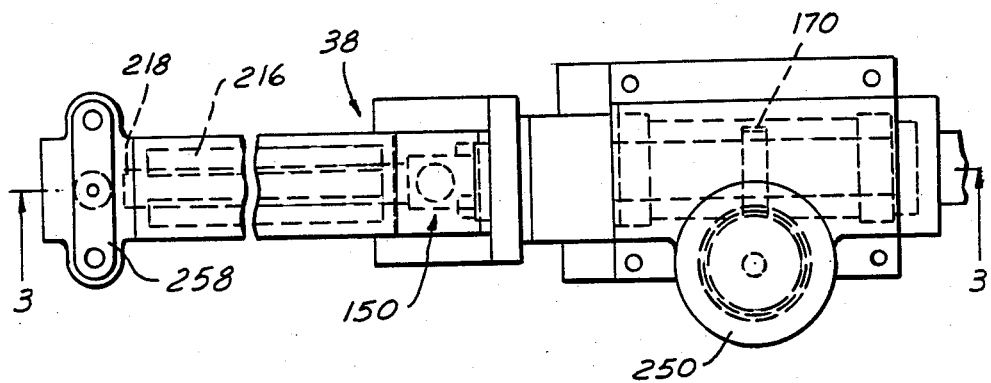
FIG. 2 is an elevational view of a laser beam rotator device at each of the work stations of FIG. 1.

Referring now to FIG. 1 a laser processing system 20 is illustrated. It includes a carbon dioxide type industrial laser unit 22 having an output laser beam directed therefrom through an output pipe 24 that is telescoped with respect to an inlet pipe 26 in a beam splitter enclosure 28. The beam splitter enclosure includes three separate output pipes 30,32 and 34. Each of the output pipes is connected to an inlet pipe 36 of a beam rotator device 38. The rotator device includes an outlet nozzle 40 that is in alignment with a work piece 42 carried on a conveyor system 44 having a pneumatic oscillator 48. Each of the oscillators 48 and a drive motor 50 for a beam sharing platform 52 are under the control of a preprogrammable computer control 52 that is operative to direct the laser beam from the laser unit 22 to only one of the rotator devices 38 whereby a laser beam from the output nozzle 40 will be directed into operative relationship with a work piece 42 that is driven with respect to the rotator device 38 under the control of the computer 52.

Referring now to FIGS. 7, 8 and 12-16, a beam sharing system 55 is illustrated. It includes the beam splitting enclosure 28. The enclosure houses the beam sharing platform 52 that carries three angularly disposed mirror assemblies 54,56,58 each of the mirror assemblies 54 through 58 includes a base 60, FIG. 13, that is rotatable about a vertical axis 62. The mirror assemblies 54 through 58 further include a clevis like support 66 in which a mirror housing 68 is supported for rotation on a horizontal axis 70. The base 60 is adjustably positioned about the vertical axis 62 and locked in a predetermined angular relationship with respect to the beam sharing platform by a circular clamp 72 that is locked in place by screws 74. The adjustable positioning of the housing 68 with respect to the clevis support 66 is accomplished by a pair of spaced clamp plates 78,80 that are releasably secured to the upper end of the spaced arms of the clevis support 66 by screws 82. The clamp plates 78,80 are thereby arranged to clamp against spaced apart trunions 84,86 on either side of the housing 68.

Consequently, each of the mirror assemblies 54 through 58 can be angularly present in an accurate relationship with respect to the beam sharing platform 52 so that they will selectively divert the output laser beam from the laser unit 22 as it is passed through the inlet pipe 26 of the beam splitter enclosure 28 to selected ones of the output pipes 30,32,34 in accordance with an indexed positioning of the beam sharing platform 52 with respect to the beam splitter enclosure 28.

Figure 8:
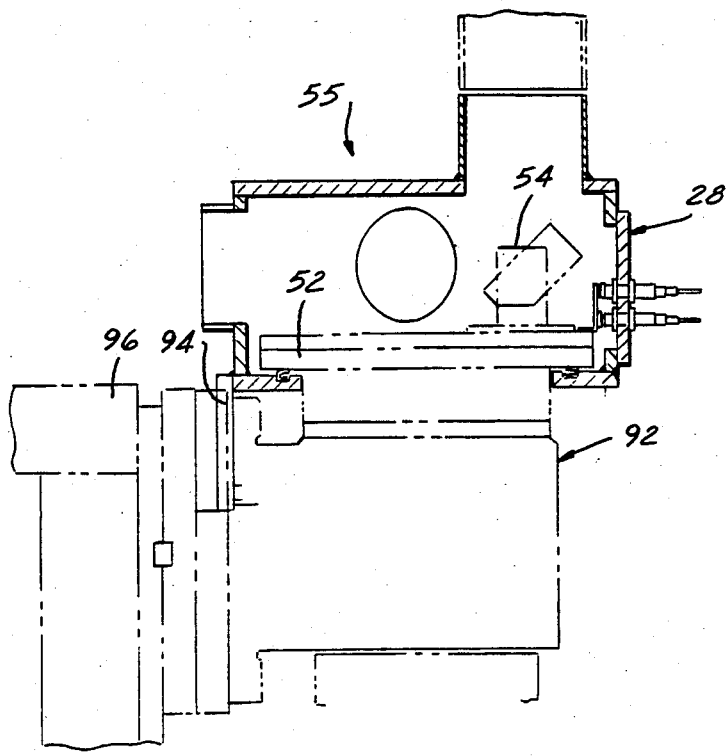
FIG. 8 is a sectional view taken along the line 8—8 of FIG. 7.
Figure 9:
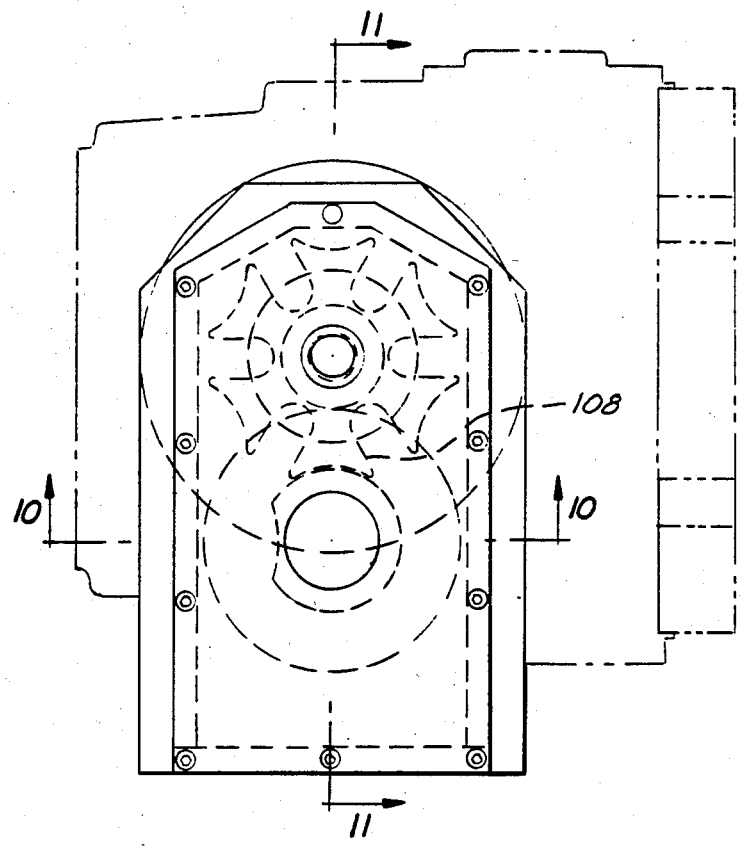
FIG. 9 is a top elevational view of a motor drive of the present invention.
Figure 10:
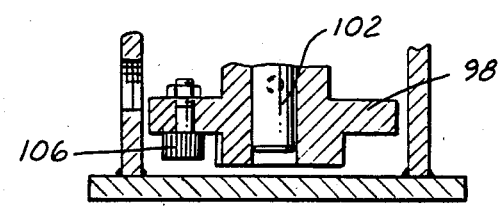
FIG. 10 is a fragmentary sectional view taken along the line 10—10 of FIG. 9 looking in the direction of the arrows.
Figure 11:
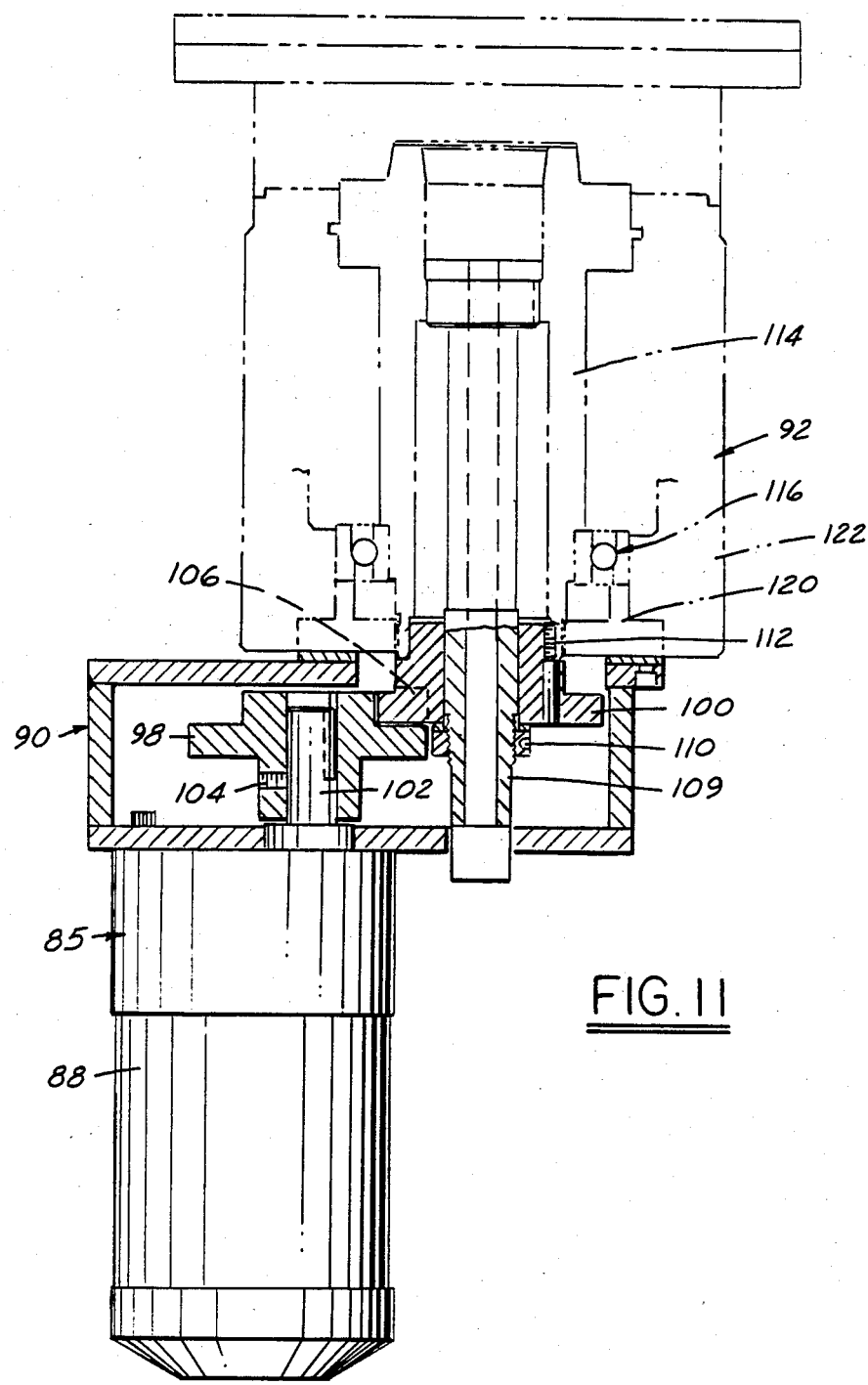
FIG. 11 is a fragmentary sectional view taken along the line 11—11 of FIG. 9 looking in the direction of the arrows.
Figure 12:
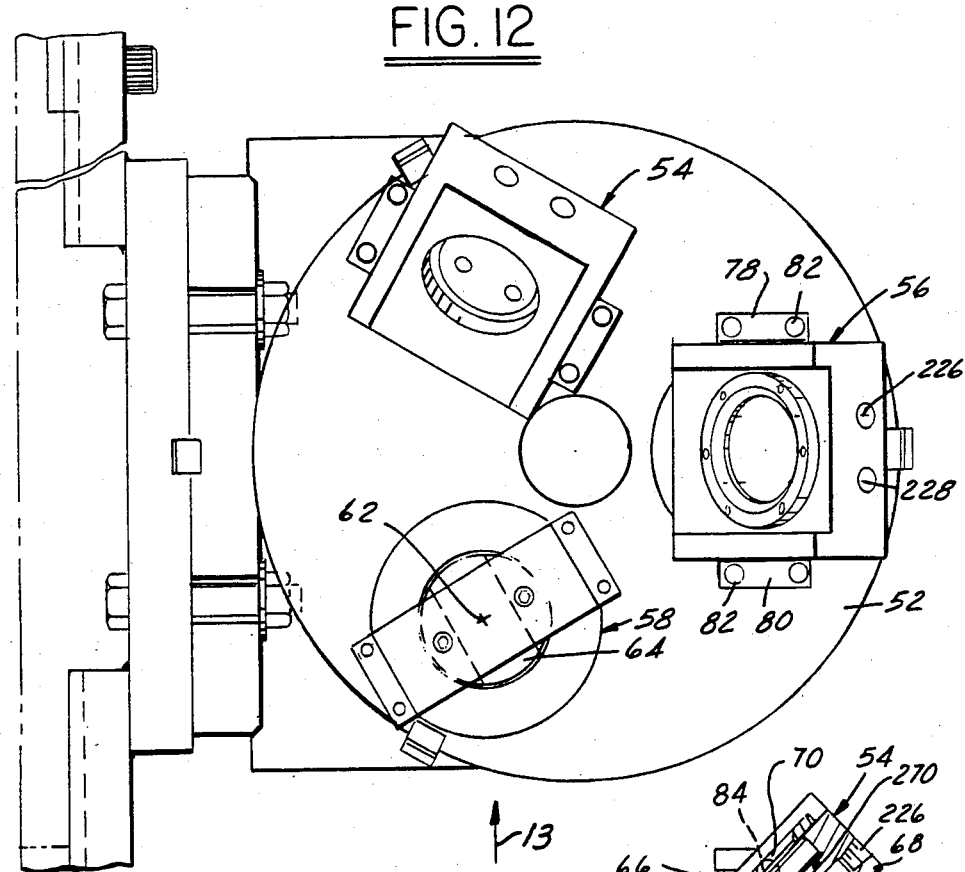
FIG. 12 is a top elevational view of a beam sharing platform.
Figure 13:
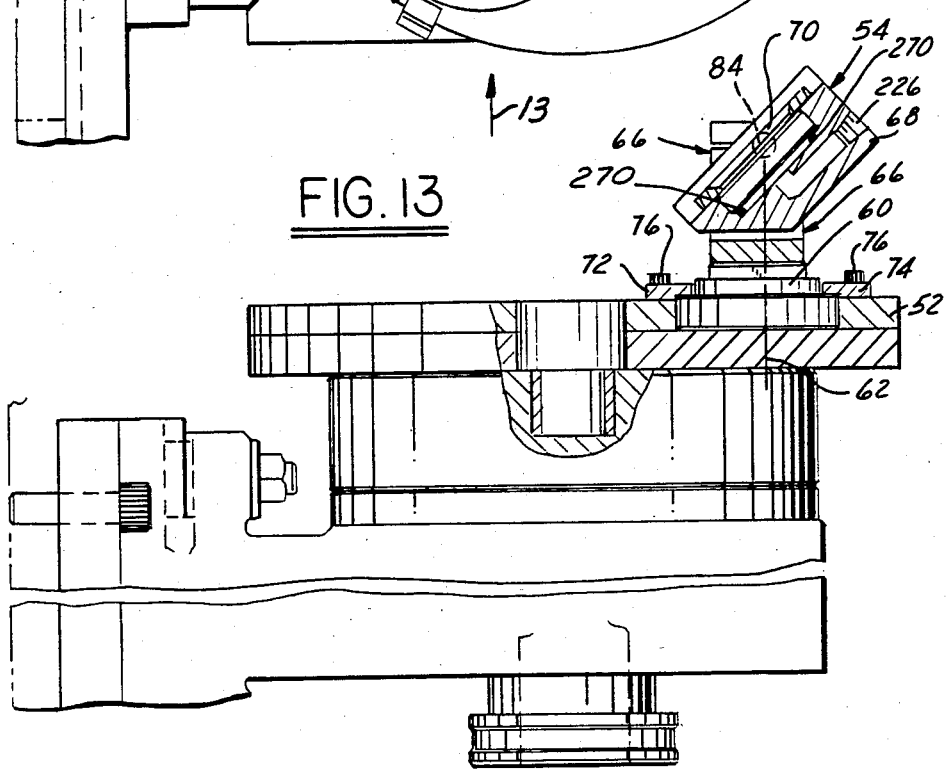
FIG. 13 is a side view, partially sectioned looking in the direction of the arrow 13 of FIG. 12.

The indexing of the beam sharing platform 52 is accomplished by a gear drive motor assembly 85, shown in FIGS. 9-11, which includes an A.C. motor 88 carried from a gear box 90. The gear box 90 in turn is supported by a guide bearing housing 92 that is supported beneath the beam splitter enclosure 28 as best shown in FIG. 8. The bearing housing 92 is connected to a slide member 94 that is slidably positioned on a guide way 96 so as to adjustably position the beam splitter enclosure 28 with respect to a frame system for the laser beam processing machine 20.

The gear box 90 houses a pair of indexing gears 98,100. The indexing gear 98 is keyed to the output shaft 102 of the drive motor 88. It is held to the shaft 102 by a set screw 104. The index gear 98 has a cam follower 106 rotatably secured to the index gear 98. The cam follower 106 is selectively rotated with respect to an involute form 108 on the index gear 100 to produce a selective stepping of the index gear 100 into one of a plurality of angular positions to assure that the angularly adjusted and preset mirror assemblies 54 will be accurately located under the inlet pipe 36 when the beam sharing platform 52 has assumed an adjusted index at rest position with respect to the beam splitter enclosure 28.

The index gear 100 is held on the end of a shaft 109 by a nut 110 that is threaded against the end of the index gear 100. A set screw 110 fixes the gear 100 with respect to a platform drive 114 which is rotatably supported by a roller bearing assembly 116. The platform drive 114 is connected to the platform 52 by suitable means. The outer race of the bearing assembly 116 is held in place by a nut 120 that is threadably received in the end 122 of the bearing housing 92.

By virtue of the aforedescribed arrangement the platform 52 and the mirrors 54,56,58 thereon are accurately angularly displaced so that the output laser beam will be directed to one of the beam rotators 38. Each of the beam rotators are more specifically illustrated in FIGS. 3 through 6. They include inlet pipe 36 that is secured by plate 130 to the upper end cap 132 of a housing 134 that is slidably supported on a slideway 136. The slideway 136 is supported on a suitable frame work (not shown) so that each of the rotator devices 38 can be height adjusted to accommodate different sized parts. The housing 134 includes a pair of spaced roller bearing units 138,140 that rotatably support a drive tube 142. The drive tube is sealed by a seal assembly 144 and it is connected to a rotatable mirror bench 146. The mirror bench 146 includes three mirror assemblies 148,150,152 that receive the output laser beam and direct it to an offset tube 156 thence through a dependent tube 158 so as to be directed into a horizontally adjustable output unit 160 including nozzle 40.

Figure 3:
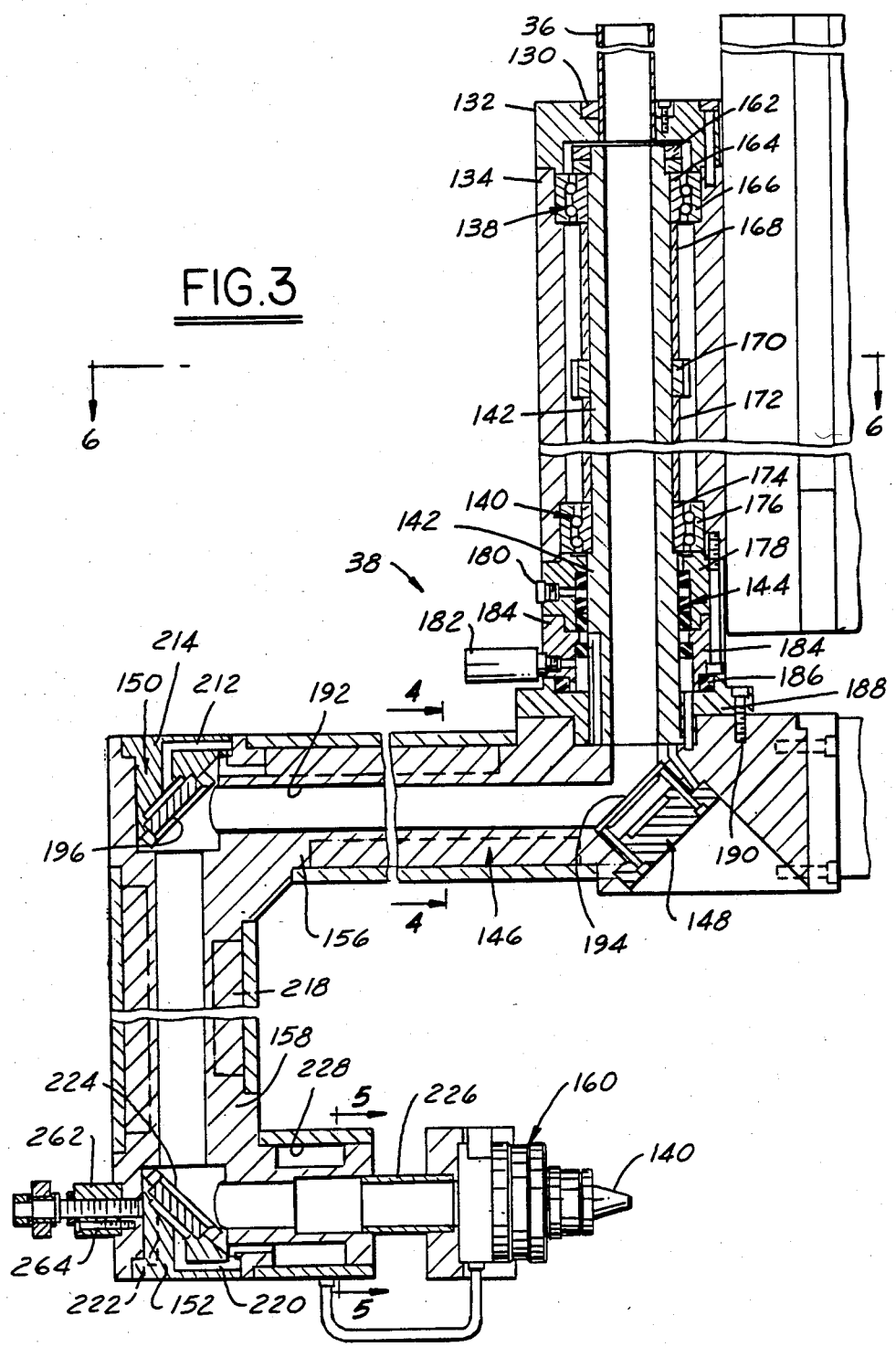
FIG. 3 is an enlarged sectional view taken along the line 3—3 of FIG. 2 looking in the direction of the arrows.
Figure 4:
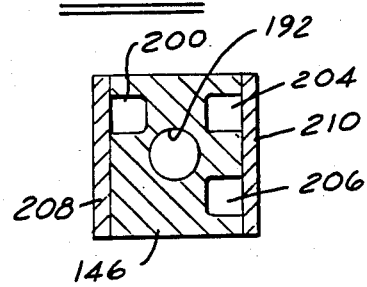
FIG. 4 is a sectional view taken along the line 4—4 of FIG. 3 looking in the direction of the arrows.

More specifically the drive tube 142 is supported vertically within the housing 134 by a pair of nuts 162 secured to the upper end thereof and engaging the inner race 164 of the bearing assembly 138 which has its outer race 166 supported by a shoulder of the housing 134 as best shown in FIG. 3. A spacer member 168 locates the inner race with respect to a helical gear 170 that is fixed to the drive tube 142. A second lower spacer unit 172 locates the gear 170 with respect to the inner race 174 of the lower bearing assembly 140 which has its outer race 176 located and held with respect to the housing 134 by a seal housing member 178. The seal housing member 178 includes a pressure fitting 180 that is adapted to be connected to a source of pressurized fluid for directing coolant into the rotating mirror bench 146. A pressure gage 182 is supported on a second seal housing 184 that is sealed by a o-ring 186 with respect to a cap 188 that is connected to the rotatable mirror bench 146 by suitable fastening means such as screws 190. The offset tube 146 has a bore 192 directed therethrough which is in alignment with the mirror surface 194 of the mirror assembly 148 and the mirror surface 196 of the mirror assembly 150. It also defines passages 200,204,206 that are closed by side plates 208,210 as shown in FIG. 4. The passages 200,204 define the supply passage and return passage to water cooling ports 212 in the mirror housing 214 which is threadably secured in the rotatable bench 146 so that the mirror assembly can be removed from a point exteriorly of the offset beam rotator 38.

Figure 5:
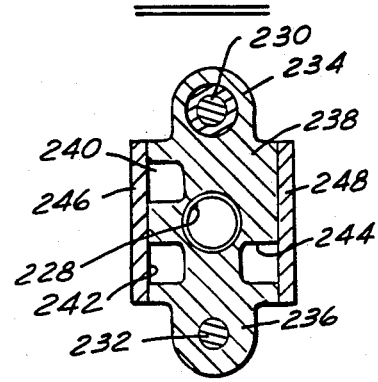
FIG. 5 is a cross sectional view taken along the line 5—5 of FIG. 3 looking in the direction of the arrows.

Likewise, as shown in FIG. 5 the dependent tube 158 includes passages 216,218 that supply the water cooling inlets and outlets 220,222 for the mirror assembly 152 that is also removably secured in the bench 146 to be accessible from the exterior thereof. The mirror assembly 152 includes a mirror surface 224 thereon that is located below the mirror surface 196 to direct the laser beam through an outlet tube 226. The outlet tube 226 is slidably supported in a bore 228 on the end of the dependent tube 158 as shown in FIG. 3. It is slidably positioned with respect to the mirror bench 146 by reciprocation on two spaced slide rods 230,232 which are located in spaced ears 234,236 of an extension 238 offset on the end of the tube 158. The offset extension 238 also includes passages 240,242,244 that are closed by side plates 246,248. The passages 240,242,244 define the cooling flow pass for the mirror assembly 152 in cooperation with those passages already defined.

Figure 6:
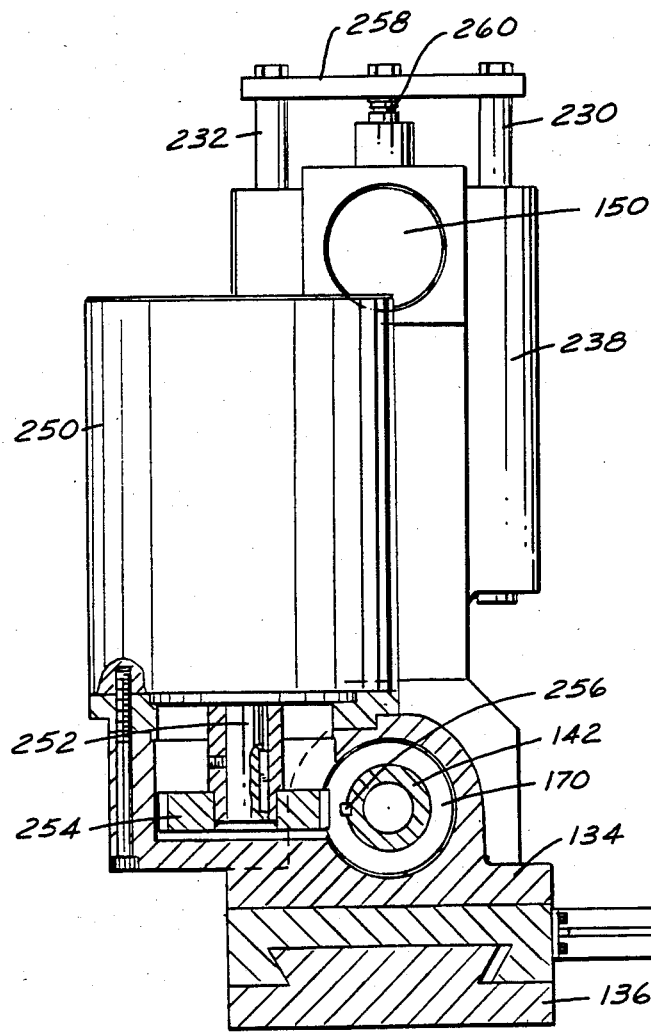
FIG. 6 is a horizontal sectional view taken along the line 6-6 of FIG. 3 looking in the direction of the arrows.
Figure 7:
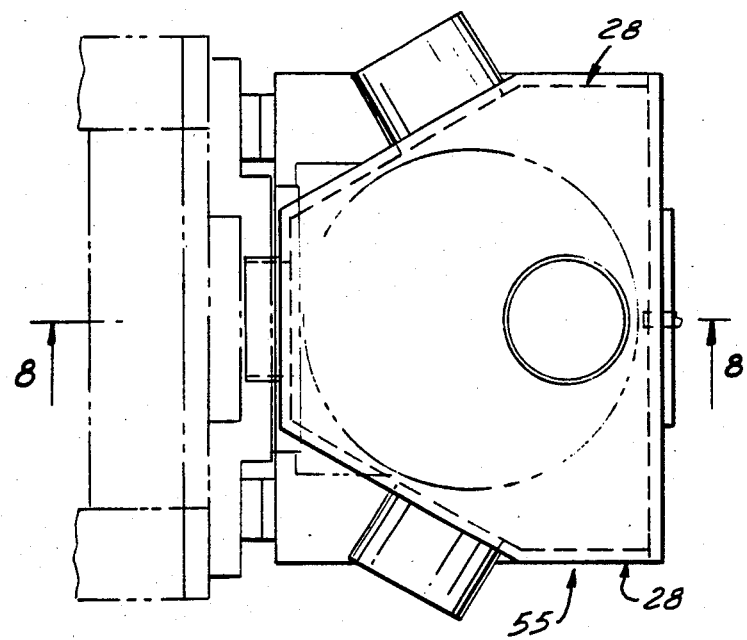
FIG. 7 is a top elevational view of a beam splitter enclosure.

In order to obtain a full 360° drive of the beam rotator 38 the unit includes a drive motor 250 which, as best shown in FIG. 6 has an output shaft 252 therefrom connected to a drive gear 254 that is in driving engagement with the helical driven gear 170 which is secured to the shaft 142 by a key element 256. The slideway 136 includes a proximity switch 258 for establishing the radial orientation of the output nozzle 160 with respect to the work piece at a given work station. Furthermore, the guide rods 230,232 are connected by a cross bar 258 to locate an adjustment screw 260 with respect to a thread block 262 that is secured to the dependent tube 158 by suitable means including a screw 164.

In operation a plurality of different or like sized work pieces 42 are carried on the conveyor 46 and under the control of the preprogrammable controller 52 are selectively advanced with respect to the output nozzle 40 as shown in FIG. 3. The laser unit 22 is energized and a predetermined indexing of the beam sharing platform 52 is produced so that one of the mirror assemblies 54 through 58 thereon is located in vertical alignment with the inlet tube 26 of the beam splitter enclosure 28. Consequently, the full power of the laser beam from the laser unit 22 is directed from the enclosure 28 to one of the output pipes 30 through 34 to one of the rotator units 38. The rotator unit is also conditioned so that its drive motor will rotate the tube 142 and the mirror bench 146 so as to cause the laser beam from the output nozzle 40 to cut the work piece on a horizontal plane. It has been found especially suitable for use in accurately and precisely forming an end surface on an exhaust pipe for automotive use. While the device has found particular application on automotive exhaust pipes it is equally suited for processing a precise configuration on other work pieces. Furthermore, while the process is illustrated as involving a full cut of the work piece so as to define an end surface on an exhaust pipe it is equally suited for performing welding operations and other processes on a work piece which is moved with respect to the rotating output nozzle 40. The individually adjustable mirrors in FIGS. 12 through 16 are also connected to individual water cooling systems at ports 266,268 on each of the mirror housing 68. The mirror itself is sealed with respect to the mirror housing by an o-ring 270 that is pressed between the housing 68 and the mirror.

We claim:

1. In a laser beam sharing system having a laser beam source, an inlet pipe and a plurality of output pipes, the improvement comprising: An enclosure, a rotatable platform supported within said enclosure; a plurality of mirror units located at predetermined circumferential points on said rotatable platform; means for angularly adjusting each of said mirror units with respect to said platform for precisely reflecting the full laser beam from the inlet pipe to one of the output pipes; means for indexably driving said platform so as to selectively position each one of said adjustable mirror units at a point to receive a laser beam from the inlet pipe for selectively directing all of such laser beam to only one of the outlet pipes; and beam rotator means for receiving and directing the laser beam from said enclosure for rotatably applying it to a work piece positioned with respect to the beam rotator means.

2. In a laser beam processing system having a single laser source, an inlet pipe and a plurality of outlet pipes, the improvement comprising: a rotatable platform having a plurality of individually angularly adjustable mirrors thereon each adjustably positioned with respect to said rotatable platform, an indexable drive means for selectively positioning said platform and individually adjustable mirrors to direct the output from the single laser source through an outlet pipe to one of a plurality of work stations; rotator means located at each of said work stations and operative to direct the laser beam from one of the outlet pipes and rotatably apply it to a workpiece; and said mirrors being angularly disposed on said platform and angularly positioned by said platform to be adjustably positioned to selectively direct the laser beam to only one of the work stations so as the single laser source will have its full energy directed to selected ones of the work stations during a processing sequence.

3. In a laser beam sharing system having an inlet and plural outlets, the improvement comprising: a rotatable platform; drive means including indexing gear means operative to accurately angularly positioned the rotatable platform with respect to a laser source; a plurality of equidistantly located adjustable mirror assemblies on said rotatable platform positioned by indexing of the rotatable platform to selectively direct the full output laser beam from the single laser source to only one of a plurality of work stations.

4. In the combination of claim 3 each of said angularly adjustable mirror assemblies including a base rotatably movable on a vertical axis; a mirror housing support including means thereon defining a horizontal axis for rotating the mirror orthogonally with respect to the vertical axis; a mirror unit fixedly and sealingly connected in the mirror housing so as to be positoned thereby to receive the full beam output of the single laser source and to direct it in a predetermined horizontal path to a work station at a point spaced therefrom.

5. In the combination of claim 4, beam rotator means located at a work station including an inlet pipe; means for directing the laser in the horizontal path to the beam rotator means; said beam rotator means including a fixed mirror optical bench defining an offset laser flow path for directing the laser beam from the beam splitting mirror assembly to a work piece; and means for rotating the output nozzle means so as to produce a full 360° exposure of the laser beam on a work piece positioned with respect to the beam rotator means.

6. A beam sharing device for a laser processing system comprising a beam splitter enclosure; a beam sharing platform having a plurality of angularly spaced laser beam reflecting mirrors thereon; said platform including a drive shaft connected thereto; a bearing housing supported on said beam splitter enclosure including bearing means therein for rotatably supporting said shaft with respect to said enclosure; an extension on said shaft; a drive motor; an indexing gear housing connected to said bearing housing including a drive gear connected to said drive motor and a driven gear; said drive gear including a rotatable cam supported thereon; said driven gear connected to said extension and including a involuted surface thereon engaged by the rotatable cam on the drive gear to selectively establish one of a plurality of separate angular locations of the shaft with respect to the beam splitter enclosure during and in response to selected energization of said drive motor.

7. A laser processing system comprising a carbon dioxide laser source, frame work support means for locating said carbon dioxide laser source in a overhead location; a fixed optics bench including a beam splitter enclosure including an inlet pipe for directing the output from the carbon dioxide laser source vertically; said beam splitter enclosure including three equally angularly located outlet pipes disposed along a horizontal line intersecting the inlet pipe to said splitter enclosure and at 120° offset angular positions with respect to said horizontal line; a beam splitter platform rotatably supported within said beam splitter enclosure; means including a pair of proximity switches located in the same angular relationship on said platform as said outlet pipes occupy on said splitter enclosure for driving said platform into a plurality of indexed positions; mirror means on said platform that are positioned to direct the carbon dioxide laser from the overhead location to one of said outlet pipes; and means including a plurality of rotatable mirror benches, one located at each of a plurality of work stations for receiving the laser beam from said mirror means and for directing said laser output to only one of the work stations at a work piece supported thereon; each of said rotatable mirror benches including an output nozzle for focusing and directing laser beam and cutting gases against the work piece at each of the work stations.

8. In the combination of claim 7 vertically adjustable slide means for carrying said rotatable beam splitter platform vertically with respect to said frame work for said carbon dioxide laser for adjusting the position of the output nozzle at each of the work stations in accordance with the physical dimensions of a work piece processed at each of the selected work station locations; and means for selectively driving the beam splitter platform and one only of said rotatable mirror bench means to produce a laser beam process at one of said stations which is matched to the work piece being processed therein.

9. A laser beam rotator assembly comprising first housing means having inlet pipe, and an output nozzle located at a 90° offset from said inlet pipe, second housing means including fixedly secured mirror assemblies defining a laser beam deflection path to direct the laser beam from said inlet pipe to said output nozzle, and means for rotating said output nozzle on said first housing means to direct the laser beam through a cutting plane.

10. In the combination of claim 9, said mirror assemblies each having a base, means for securing each of said bases to said second housing means for replacement of each of said mirror assemblies from exteriorly of said second housing means.

11. In the laser beam rotator assembly of claim 9, said means for rotating said output nozzle including drive motor means on said first housing means and a driven member located interiorly of said first housing means, means coupling said driven member to said second housing means for rotating said second housing means on said first housing means.

12. In the combination of claim 11, said output nozzle being supported on said second housing means for rotation therewith.

13. In the combination of claim 11, said driven member being a tube located in telescoping relationship with said first housing means and aligned with said inlet pipe to define a laser beam path through said first housing means.

14. In the laser beam assembly of claim 9, said means for rotating said output nozzle on said first housing means including a drive tube located in telescoping relationship with said first housing means, and bearing means on said first housing means rotatably supporting said drive tube thereon.

* * * * *